(12) United States Patent
Li et al.

(10) Patent No.: US 11,194,805 B2
(45) Date of Patent: Dec. 7, 2021

(54) OPTIMIZATION OF DATABASE EXECUTION PLANNING

(71) Applicant: International Business Machines Corporation, Armonk, NY (US)

(72) Inventors: Shuo Li, Beijing (CN); Xiao Xiao Chen, Beijing (CN); ShengYan Sun, Beijing (CN); Xiaobo Wang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 304 days.

(21) Appl. No.: 16/435,806

(22) Filed: Jun. 10, 2019

(65) Prior Publication Data

US 2020/0387507 A1  Dec. 10, 2020

(51) Int. Cl.
*G06F 16/2453* (2019.01)
*G06F 16/22* (2019.01)

(52) U.S. Cl.
CPC .... *G06F 16/24542* (2019.01); *G06F 16/2282* (2019.01)

(58) Field of Classification Search
CPC .................. G06F 16/24542; G06F 16/2282
See application file for complete search history.

(56) References Cited

U.S. PATENT DOCUMENTS

| | | | |
|---|---|---|---|
| 7,124,272 B1 * | 10/2006 | Kennedy | G06F 3/0613 711/173 |
| 7,536,379 B2 | 5/2009 | Purcell | |
| 7,725,448 B2 | 5/2010 | Beavin et al. | |
| 8,478,775 B2 | 7/2013 | Netz et al. | |
| 8,631,028 B1 * | 1/2014 | Pettovello | G06F 16/8373 707/765 |
| 8,825,629 B2 | 9/2014 | Lawande et al. | |
| 9,251,155 B1 | 2/2016 | Galimberti et al. | |
| 2008/0177694 A1 * | 7/2008 | Chaudhuri | G06F 16/24542 |
| 2009/0077078 A1 * | 3/2009 | Uppala | G06F 7/32 |
| 2010/0211577 A1 * | 8/2010 | Shimizu | G06F 16/24537 707/752 |
| 2011/0289091 A1 | 11/2011 | Collins et al. | |
| 2011/0295862 A1 | 12/2011 | Taylor | |

(Continued)

OTHER PUBLICATIONS

Wang et al., "Avoiding Sorting and Grouping In Processing Queries," Proceedings of the 29th VLDB Conference, 2003, 12 pages.

(Continued)

*Primary Examiner* — Wilson Lee
(74) *Attorney, Agent, or Firm* — Peter K. Suchecki

(57) ABSTRACT

A query including at least a first part and a second part can be received by an electronic system. The first part of the query can indicate to access at least a first database table and a second database table to generate an intermediate result. The second part of the query can indicate to perform a sort operation on the intermediate result with respect to columns across the first database table and the second database table to produce a final result. The method further includes building execution plans for generating the intermediate result according to the first part, where the intermediate result is to be used as the final result without building an execution plan for performing the sort operation.

9 Claims, 5 Drawing Sheets

(56) References Cited

U.S. PATENT DOCUMENTS

| | | | | |
|---|---|---|---|---|
| 2015/0220600 | A1* | 8/2015 | Bellamkonda | G06F 16/2456 |
| | | | | 707/747 |
| 2016/0378833 | A1* | 12/2016 | Chainani | G06F 16/2456 |
| | | | | 707/741 |
| 2017/0060944 | A1* | 3/2017 | Khayyat | G06F 16/2282 |
| 2017/0185649 | A1* | 6/2017 | Tran | G06F 16/24556 |
| 2018/0121494 | A1* | 5/2018 | Antonopoulos | G06F 16/2379 |
| 2018/0165335 | A1* | 6/2018 | Kong | G06F 16/24537 |
| 2019/0303472 | A1* | 10/2019 | Drescher | G06F 16/24565 |

OTHER PUBLICATIONS

"Indexes to avoid sorts," Db2 for z/OS 10.0.0, IBM Knowledge Center, printed: Apr. 1, 2019, 3 pages. https://www.ibm.com/support/knowledgecenter/en/SSEPEK_10.0.0/perf/src/tpc/db2z_useindex2avoidsort.html.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

\* cited by examiner

T1

| c1 | c2 | c3 |
|---|---|---|
| 10 | 10 | 10 |
| 10 | 8 | 9 |
| 9 | 11 | 2 |
| ... | ... | ... |

FIG. 4A  INDEX:Idx1_T1(c1, c2)

T2

| c1 | c2 | c3 | c4 |
|---|---|---|---|
| 10 | 10 | 10 | 1 |
| 10 | 8 | 9 | 2 |
| 9 | 11 | 2 | 2 |
| ... | ... | ... | ... |

FIG. 4B  INDEX:Idx1_T2(c1, c2, c3)

T3

| T1.c1 | T1.c2 | T1.c3 | T2.c1 | T2.c2 | T2.c3 | T2.c4 |
|---|---|---|---|---|---|---|
| 10 | 8 | 9 | 10 | 8 | 9 | 2 |
| 10 | 10 | 10 | 10 | 10 | 10 | 1 |
| 9 | 11 | 2 | 9 | 11 | 2 | 2 |

| T1.c1 | T1.c2 | T1.c3 | T2.c1 | T2.c2 | T2.c3 | T2.c4 |
|---|---|---|---|---|---|---|
| 9 | 11 | 2 | 9 | 11 | 2 | 2 |
| 10 | 8 | 9 | 10 | 8 | 9 | 2 |
| 10 | 10 | 10 | 10 | 10 | 10 | 1 |

510

RECEIVING A QUERY COMPRISING AT LEAST A FIRST PART AND A SECOND PART, THE FIRST PART INDICATING TO ACCESS AT LEAST A FIRST AND A SECOND DATABASE TABLES TO GENERATE AN INTERIVIEDIATE RESULT, AND THE SECOND PART INDICATING TO PERFORM A SORT OPERATION ON THE INTERMEDIATE RESULT WITH RESPECT TO COLUMNS ACROSS THE FIRST AND THE SECOND DATABASE TABLES TO PRODUCE A FINAL RESULT

520

BUILDING EXECUTION PLANS FOR GENERATING THE INTERMEDIATE RESULT ACCORDING TO THE FIRST PART, WHEREIN THE INTERMEDIATE RESULT IS TO BE USED AS THE FINAL RESULT WITHOUT BUILDING AN EXECUTION PLAN FOR PERFORMING THE SORT OPERATION

FIG. 5

OPTIMIZATION OF DATABASE EXECUTION PLANNING

BACKGROUND

The present disclosure relates to database processing and, in particular, to optimization of database execution planning for improving performance in database processing.

Query requests with respect to databases often require data to be ordered based on some criterion. When a query request requires an order based on a criterion that is not already provided in some existing database index, a database execution planner can decide to sort result rows of the query request by applying the desired ordering criterion. While sorting is a fundamental operation in databases, unnecessary sorting operations can be extra overhead.

SUMMARY

Embodiments can be directed towards a computer-implement method. The method includes receiving a query including at least a first part and a second part. The first part can indicate to access at least a first database table and a second database table to generate an intermediate result. The second part can indicate to perform a sort operation on the intermediate result with respect to columns across the first database table and the second database table to produce a final result. The method further includes building execution plans for generating the intermediate result according to the first part, where the intermediate result is to be used as the final result without building an execution plan for performing the sort operation.

Embodiments can also be directed towards a system that includes at least one processor and a computer-readable memory coupled to the at least one processor. The computer-readable memory includes instructions that when executed by the at least one processor perform the following operations: receiving a query including at least a first part and a second part, the first part indicating to access at least a first database table and a second database table to generate an intermediate result and the second part indicating to perform a sort operation on the intermediate result with respect to columns across the first database table and the second database table to produce a final result. The instructions also build execution plans for generating the intermediate result according to the first part, wherein the intermediate result is to be used as the final result without building an execution plan for performing the sort operation.

Embodiments can also be directed towards a computer program product including a computer-readable storage medium having program instructions embodied therewith is provided. The program instructions are executable by a processor to cause the processor to perform the following actions: receiving a query including at least a first part and a second part, the first part indicating to access at least a first database table and a second database table to generate an intermediate result, and the second part indicating to perform a sort operation on the intermediate result with respect to columns across the first database table and the second database table to produce a final result. The instructions also build execution plans for generating the intermediate result according to the first part, wherein the intermediate result is to be used as the final result without building an execution plan for performing the sort operation.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 4A shows an example database table used in describing embodiments consistent with the figures.

FIG. 4B shows an example database table used in describing embodiments consistent with the figures.

FIG. 4C includes a table as an intermediate result of execution of a database query, according to embodiments consistent with the figures.

FIG. 4D includes a table as a final result of execution of a database query according embodiments consistent with the figures.

FIG. 5 includes a flowchart of the general process of a method according to embodiments consistent with the figures.

Figure 1:
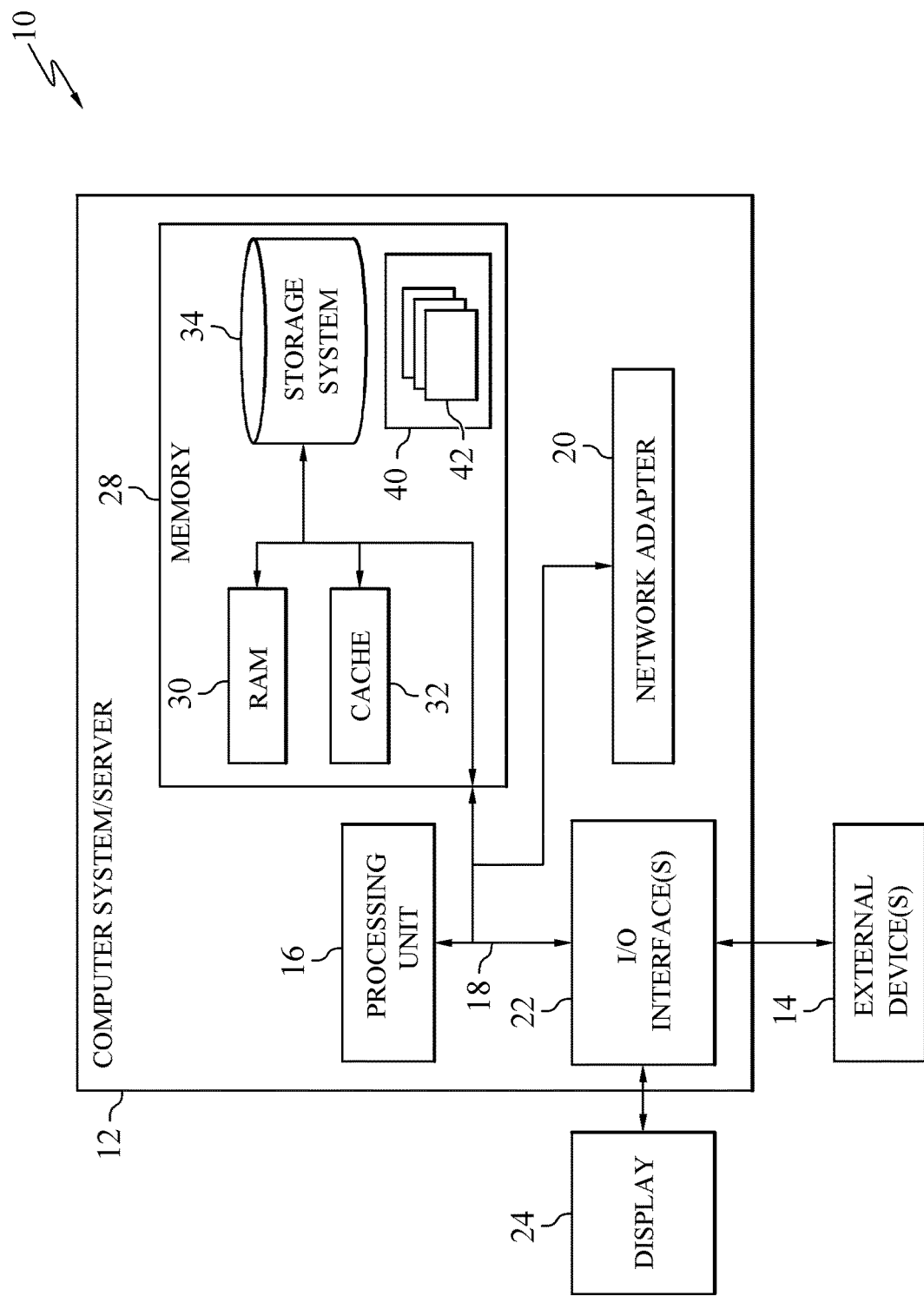
FIG. 1 depicts a cloud computing node, according to embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

In the drawings and the Detailed Description, like numbers generally refer to like components, parts, operations, and processes.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, computer system/server 12 in cloud computing node 10 is shown in the form of a general-purpose computing device. The components of computer system/server 12 can include, but are not limited to, at least one processor or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk e.g., a "floppy disk", and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set, e.g., at least one, of program modules that are configured to carry out the functions of embodiments of the disclosure.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the disclosure as described herein.

Computer system/server 12 can also communicate with one or more external devices 14 such as a keyboard, a pointing device, a display 24, etc.; one or more devices that enable a user to interact with computer system/server 12; and/or any devices, e.g., network card, modem, etc., that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
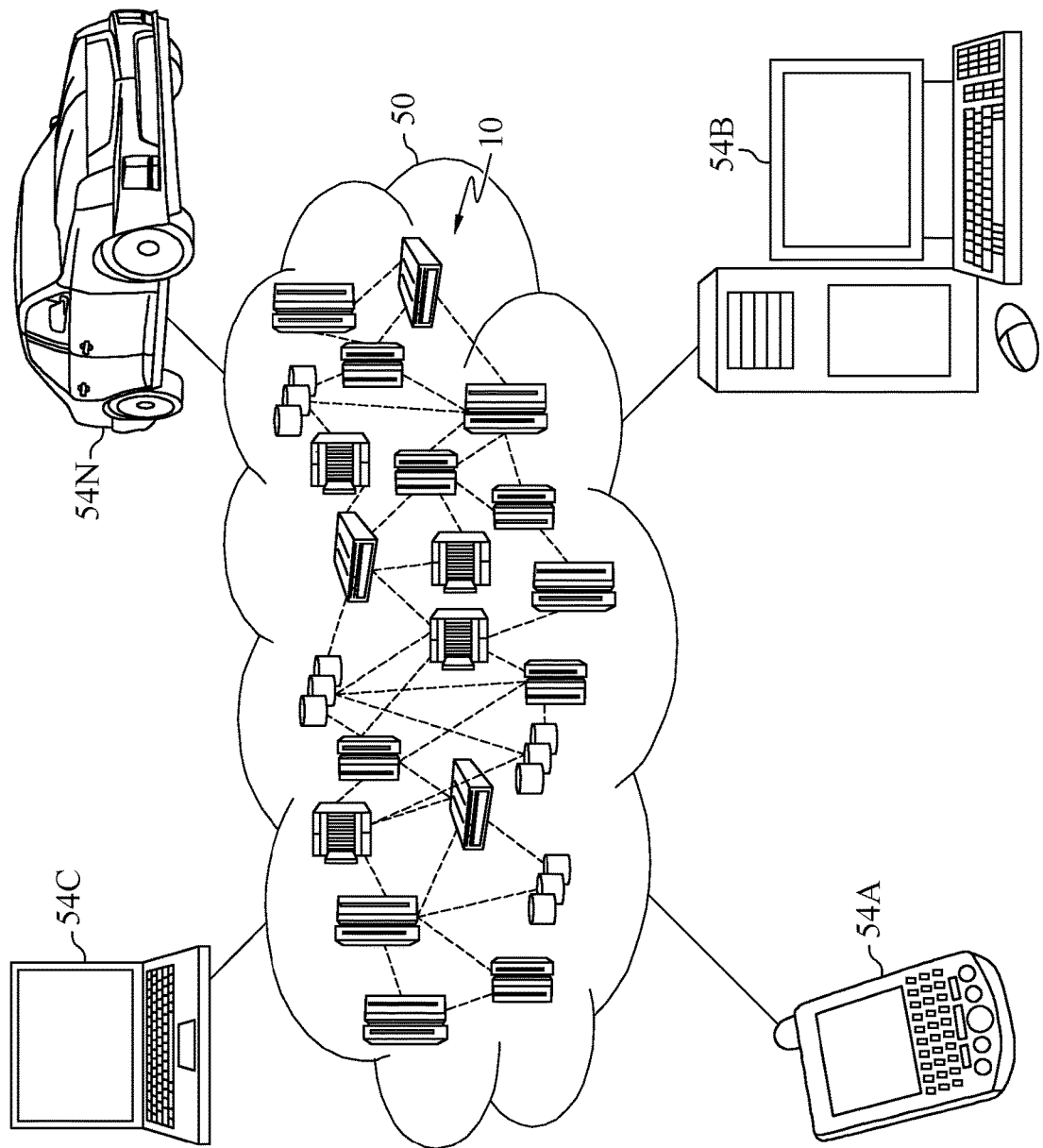
FIG. 2 depicts a cloud computing environment, according to embodiments consistent with the figures.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
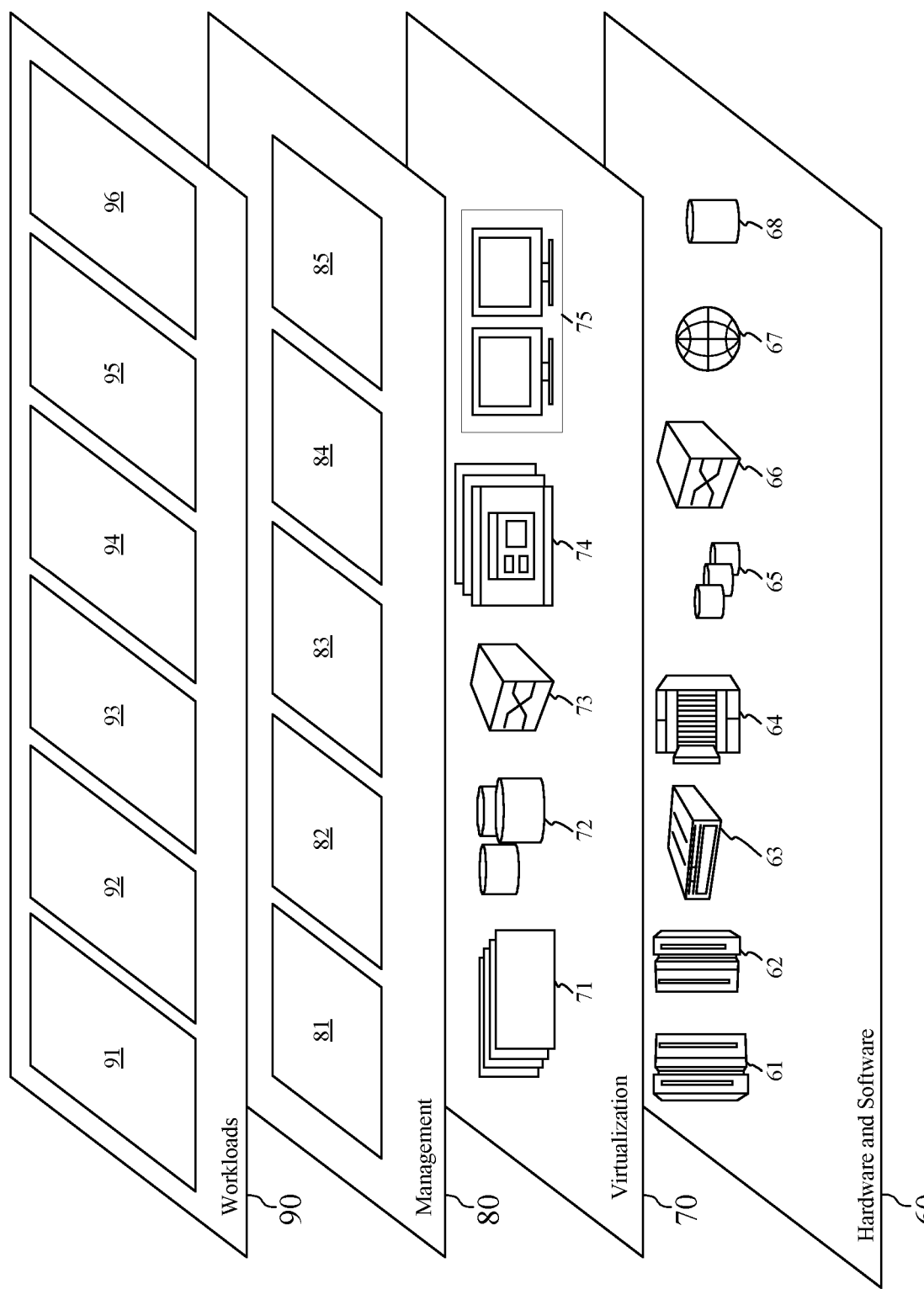
FIG. 3 depicts abstraction model layers, according to embodiments consistent with the figures.

Referring now to FIG. 3, a set of functional abstraction layers provided by cloud computing environment 50, FIG. 2, is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and optimization of database execution planning 96.

With reference now to accompanying drawings, embodiments of the present disclosure will be described. The embodiments are directed to a method, system and computer program product for optimization of database execution planning.

It should be noted that the processing of the method for optimization of database execution planning of the present disclosure can be implemented by computer system/server 12 of FIG. 1.

The present disclosure proposes a method to enhance the performance of execution of database queries which need to output ordered result data from across multiple database tables.

Database data often need to be ordered based on some criterion. The need is often addressed in database query requests. For example, SQL® (Structured Query Language) is a structured query language which can be used to design query requests for querying databases for data. The query requests often require data to be ordered based on some criterion. When a query request requires an order of result rows based on some criterion that is not provided in some existing database index, an execution planner can decide to sort the result rows by applying the ordering criterion. While sorting is an important operation, it is also places an overhead burden on computing resources.

The present disclosure relates to sort operations on data from two or more database tables. Before describing embodiments of the disclosure, it would be helpful to consider two example database tables which will be used for illustrating embodiments of the disclosure. Below is an example procedure that creates two database tables.

```
CREATE TABLE T1 (c1 int, c2 int, c3 int);
/*create a table called "T1" containing three columns: c1, c2 and c3 */
CREATE TABLE T2(c1 int, c2 int, c3 int, c4 int);
CREATE INDEX Idx1_T1 on T1 (c1, c2);
/* create an index called "Idx1_T1" on a combination of columns "c1" and "c2" in the "T1" table*/
CREATE INDEX Idx1_T2 on T2 (c1, c2, c3); /* create an index called "Idx1_T2" on a combination of columns "c1," "c2" and "c3" in the "T2" table*/
    INSERT INTO T1(c1, c2, c3) values (10, 10, 10);
    /*insert a row with values 10, 10 and 10 for columns "c1," "c2" and "c3" in the "T1" table*/
    INSERT INTO T1(c1, c2, c3) values (10, 8, 9);
    INSERT INTO T1(c1, c2, c3) values (9, 11, 2);
    ...
    INSERT INTO T2(c1, c2, c3, c4) values (10, 10, 10, 1);
    /*insert a row with values 10, 10, 10 and 10 for columns "c1," "c2," "c3" and "c4" in the "T2" table*/
    INSERT INTO T2(c1, c2, c3, c4) values (10, 8, 9, 2);
    INSERT INTO T2(c1, c2, c3, c4) values (9, 11, 2, 2);
    ...
    commit;
```

Execution of the above procedure can generate two relational database tables, named "T1" and "T2" respectively. The structure and records of the database table (hereinafter also referred to as "table" for conciseness) T1 is depicted in FIG. 4A. T1 has three columns, c1, c2 and c3, as presented in the table header. Under the table header are rows representing database records. For example, the first row contains values 10, 10 and 10 for the three columns c1, c2 and c3 respectively.

The index "Idx1_T1(c1, c2)" generated for the table T1 is depicted below the table T1.

FIG. 4B depicts the table T2, which is structured similarly to T1. As shown, T2 includes four columns, c1, c2, c3 and c4. Three of them are same as the columns c1, c2, and c3 of table T1. Likewise, the index "Idx1_T2(c1, c2, c3)" generated for the table T2 is depicted below the table T2.

It is known that indexes, such as Idx1_T1(c1, c2) and Idx1_T2(c1, c2, c3), can be useful in retrieving data from the database. There can be different indexes built for a single database table. However, the number of indexes for a table is usually limited because the overhead of indexing is high.

The two tables T1 and T2 will serve as representative of example database tables for use below and throughout the present disclosure. To better understand embodiments of the present disclosure, it can be helpful to consider two database requests in the form of SQL query with respect to T1 and T2 as an example.

SQL Query Example One: Query_1
SELECT T1.*, T2.*FROM T1
LEFT OUTER JOIN T2
WHERE T1.c1=T2.c1 AND T1.c2=T2.c2

The execution of Query_1 generally includes the following processing stages.

In a first stage S1, a read and a filter operation are performed with respect to a first table, T1. An intermediate result R1 is generated. The intermediate result R1 includes selected records (or rows) from T1 based on the equal join predicate "T1.c1=T2.c1" and the equal join predicate "T1.c2=T2.c2" in the "WHERE" clause of Query_1. In this case, the first three records of T1 are selected. Each of the records consists of selected columns as specified by "T1.*" in Query_1, which are T1.c1, T1.c2 and T1.c3.

Stage S1 is followed by a second stage S2. In stage S2, a read and a filter operation are performed with respect to a second table T2 in a similar way as in stage S1. An intermediate result R2 is generated. The intermediate result R2 includes selected records from T2 based on the equal join predicates "T1.c1=T2.c1" and "T1.c2=T2.c2." In this case, the intermediate result R2 includes the first three records of T2. Each of the records consists of T2.c1, T2.c2, T2.c3 and T2.c4 as specified by "T2.*" in Query_1.

In a third stage S3, a join operation is performed with respect to R1 and R2, resulting in a final output. FIG. 4C depicts the output of Query_1 in the form a table T3.

Those skilled in the art can appreciate that the division of the stage S2 and the stage S3 is purely conceptual. They can be embodied in a single stage.

SQL Query Example Two: Query_2
SELECT T1.*, T2.*
FROM T1 LEFT OUTER JOIN T2
WHERE T1.c1=T2.c1 AND T1.c2=T2.c2
ORDER BY T2.c1, T1.c2, T2.c3;

Compared to Query_1, the only difference of Query_2 is that it has an additional clause "order by T2.c1, T1.c2, T2.c3." Correspondingly, the execution of Query_2 includes a fourth stage S4 in addition to three stages S1, S2 and S3 similar to those for Query_1 as described above. In the fourth stage S4, a sort operation is performed with respect to an intermediate result of the stage S3, which is T3 in this case. The output of the sort operation is depicted in a table T4 of FIG. 4D, which is also the final output the execution of Query_2.

Compared to T3, the rows in T4 are in a sorted order that complies with the clause "order by T2.c1, T1.c2, T2.c3."

It can be appreciated that the stages are executed according to execution plans, also referred to as "access plan," defined by an execution planner, hereinafter also referred to as "planner," together with a plan optimizer, hereinafter also referred to as "optimizer." For example, upon receiving the query Query_2, the planner and/or the optimizer can define execution plans in stages for the execution of Query_2. For example, a first plan, a second plan, a third plan and a fourth plan can be defined respectively corresponding to the stages S1, S2, S3 and S4 as illustrated in the above.

Conventionally, as illustrated in the above process for the example Query_2, a sort operation on an intermediate result is always planned to generate a final result in a desired order. However, it can be observed that, in some cases, the desired order can be achieved even if such a sort operation is not planned and executed.

FIG. 5 depicts a flowchart of a method for optimization of database execution planning, according to embodiments. The method can be implemented in building execution plans for a database request, such as a SQL query, with respect to database tables needing sort operation with respect to columns across the tables. In practice, the method can be implemented by an execution planner, which can be in coordination with a plan optimizer. It can be noted that the functionality of various execution planners and plan optimizers well known in the art can be incorporated to realize some aspects that are necessary for, but not the focus of, the present disclosure.

Method 500 includes general operations 510 and 520. At operation 510, a query is received. The query includes at least a first part and a second part, the first part indicating to access at least a first database table and a second database table to generate an intermediate result and the second part indicating to perform a sort operation on the intermediate result with respect to columns across the first database table and the second database table to produce a final result.

Assume the query Query_2 is received at operation 510 as an example. Query_2 includes at least two parts. The first part is "select T1.*, T2.* from T1 left outer join T2 where T1.c1=T2.c1 and T1.c2=T2.c2." This part indicates to access two database tables, T1 and T2, to generate an intermediate result. The intermediate result can look like the three rows as depicted in table T3 of FIG. 4C.

The second part is "order by T2.c1, T1.c2, T2.c3," which indicates performing a sort operation on the intermediate result, i.e., the three rows in T3, with respect to columns across the first database table and the second database table, i.e., "T2.c1," "T1.c2," "T2.c3." Specifically, according to the clause "order by T2.c1, T1.c2, T2.c3" of Query_2, the three rows can be sorted with respect to three columns, T2.c1, T1.c2 and T2.c3. For purpose of conciseness, hereinafter, the columns across the first table and the second table are also referred to as "cross-table sort columns," in the sense that they belong to different tables. Specifically, "T2.c1" and "T2.c3" belong to T2 and "T1.c2" belongs to T1. The cross-table sort columns can be extracted from the clause "order by T2.c1, T1.c2, T2.c3," denoted herein as <T2.c1→T1.c2→T2.c3>.

Next, in operation 520, execution plans can be built for generating the intermediate result according to the first part of the query, wherein the intermediate result is to be used as the final result without building an execution plan for performing the sort operation. The execution plans can be built by an execution planner.

According to embodiments, operation 520 can be implemented in a way represented by a sequence of sub-operations 520_1, 520_2, 520_3 and 520_4, as detailed below.

According to embodiments, equivalent sort columns of the cross-table sort columns can be determined based on the query, wherein the equivalent sort columns are equivalent to the cross-table sort columns and belong to the second database table (sub-operation 520_1). In the instance case, the equivalent sort columns of the cross-table sort columns <T2.c1→T1.c2→T2.c3> are <T2.c1→T2.c2→T2.c3>.

The equivalent sort columns can be determined in the following way. First, based on the clause "where T1.c1=T2.c1 and T1.c2=T2.c2" in the first part of Query_2, T2.c2 is an equivalent column of T1.c2, which is one column from the cross-table sort columns <T2.c1→T1.c2→T2.c3>. Thus, the equivalent sort columns <T2.c1→T2.c2→T2.c3> can be determined simply by replacing T1.c2 in <T2.c1→T1.c2→T2.c3> with T2.c2.

It can be noted that T1.c1 is an equivalent column of T2.c1, which is one column from the cross-table sort columns <T2.c1→T1.c2→T2.c3>. In general, an equivalent column refers to a column from one table that is equivalent to a sort column from another table. The equivalent column can be determined based on the first part of the query, Query_2. In the instant case, the equivalent column can be determined based on equal predicates in the clause "where T1.c1=T2.c1 and T1.c2=T2.c2."

According to embodiments, an order array can be identified based on the query, in sub-operation 520_2. The order array can include one or more columns of the first database table and is equivalent to a subset of the equivalent sort columns. In the present example, the order array includes T1.c1 and T1.c2 and is denoted as <T1.c1→T1.c2>. The order array is equivalent to a subset <T2.c1→T2.c2> of the equivalent sort columns <T2.c1→T2.c2→T2.c3>. The order array can be identified based on mapping relationship between the cross-table sort columns and the equivalent columns.

As described with respect to the SQL Query example two in the above, in executing the query Query_2, T1 will be accessed prior to T2. Therefore, in building execution plans, an execution plan for accessing T1 will be built prior to an execution plan for accessing T2.

According to embodiments, a first execution plan for accessing the first database table can be built based on the first part of query by using a first index found to be consistent with the order array in sub-operation 520_3.

In accordance with the present example, it is assumed that an index Idx1_T1(c1, c2) for T1 is available for use. Coincidently, Idx1_T1(c1, c2) is consistent with the order array <T1.c1→T1.c2>, or supportive of <T1.c1→T1.c2>. Therefore, Idx1_T1(c1, c2) can serve as the first index. Because <T1.c1→T1.c2> is equivalent to <T2.c1→T2.c2>, Idx1_T1(c1, c2) is also supportive of <T2.c1→T2.c2>, the subset of <T2.c1→T2.c2→T2.c3>. As can be appreciated by those skilled in the art, when the first execution plan is executed, the T1 is accessed using Idx1_T1(c1, c2). Thus, rows in T1 will be accessed in the order that is consistent with the equivalent sort columns <T2.c1→T2.c2→T2.c3>, thereby consistent with cross-table sort columns <T2.c1→T1.c2→T2.c3>.

According to embodiments, a second execution plan for accessing the second database table can be built based on the first part of the query by using a second index found to be consistent with the equivalent sort columns on the basis of the first execution plan, for example, in sub-operation 520_4.

Specifically, assume an index Idx1_T2(c1, c2, c3) for T2 is in place for use. Coincidently, Idx1_T2(c1, c2, c3) is consistent with the equivalent sort columns <T2.c1→T2.c2→T2.c3>, of which the subset <T2.c1→T2.c2> is equivalent to the order array <T1.c1→T1.c2>. As can be appreciated by those skilled in the art, when the second execution plan is executed, the T2 will be accessed further in a desired order with respect to the column "c3."

In the instance case where both Idx1_T1(c1, c2) for T1 and Idx1_T2(c1, c2, c3) for T2 are available, the execution of the first plan in combination of the second plan would produce an intermediate result in which data rows are of the same order as in T4 of FIG. 4D. Thus, the intermediate result can be used as the final result without building an execution plan for performing the sort operation.

In the practice of the present invention, it can be reviewed whether the execution plans have been built as a result of executing the sub-operations 520_1, 520_2, 520_3 and 520_4. For example, if Idx1_T1(c1, c2) were not available, the first execution plan would not be the same as in the sub-operation 520_3. Similarly, if Idx1_T2(c1, c2, c3) were not available, the second execution plan would not be the same as in the sub-operations 520_4. In either case, it can be determined that the intermediate result might not be in an order indicated by the second part of the query. In that case, it can be determined that the sort operation is necessary. Then the execution planner will build an execution plan for performing the sort operation.

However, if the execution plans have been built in a manner as described in the sub-operations 520_1 through 520_4, then it can be determined that it is not necessary to perform the sort operation on the intermediate result. Then the execution planner will not generate any execution plan for performing the sort operation. The execution planner can decide that the intermediate result can serve as the final result without having to build an execution plan for performing the sort operation as indicated in the second part of the query. In the practice of the present disclosure, execution planning can be optimized so that a sort operation can be avoided without affecting the desired final result of some database request. Thereby, the performance of the execution of database queries can be improved.

It can be noted that in the above description, Query_2 is used as an example. However, the principle of embodiments of the disclosure also can also applicable to other queries that can need a sort operation with respect to cross-table columns. It is also to be noted that the planner and the optimizer mentioned in this disclosure are components for DB2 database, for example. There are corresponding components of similar functionality for other types of databases.

Embodiments have been described above, particularly with respect to the SQL query as an example. However, the principle of the disclosure is by no means limited to the example. As noted above, those skilled in the art can appreciate that, as design choices, a variety of equivalent or alternative methods and techniques in accordance with the principle of the disclosure can be implemented for the operation of cluster computing systems with configuration and protocol similar or equivalent to the SQL query. Therefore, those design choices can be construed as falling into the scope and spirit of the disclosure.

Embodiments of the present disclosure can be a system, a method, and/or a computer program product at any possible technical detail level of integration. The computer program product can include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational operations to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for the purpose of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, with at least one processor, a query including a first part and a second part, the first part indicating to access at least a first database table and a second database table to generate an intermediate result, and the second part indicating to perform a sort operation on the intermediate result with respect to columns across the first database table and the second database table to produce a final result; and
   building, with the at least one processor, execution plans for generating the intermediate result according to the first part, wherein the intermediate result is to be used as the final result without building an execution plan for performing the sort operation, wherein building the execution plans comprises:
      determining, with the at least one processor, equivalent sort columns of the columns across the first database table and the second database table based on the query, wherein the equivalent sort columns are equivalent to the columns across the first database table and the second database table and belong to the second database table; and
      identifying, with the at least one processor, an order array based on the query, wherein the order array comprising one or more columns of the first database table and being equivalent to a subset of the equivalent sort columns.

2. The computer-implemented method of claim 1, wherein building execution plans for generating the intermediate result according to the first part further comprises:
   building, with the at least one processor, a first execution plan for accessing the first database table based on the first part of the query by using a first index found to be consistent with the order array.

3. The computer-implemented method of claim 2, wherein building execution plans for generating the intermediate result according to the first part further comprises:
   building, with the at least one processor, a second execution plan for accessing the second database table based on the first part of the query by using a second index found to be consistent with the equivalent sort columns on a basis of the first execution plan.

4. A system comprising:
   at least one hardware processor; and
   a computer-readable memory coupled to the at least one hardware processor, the computer-readable memory comprising instructions that when executed by the at least one hardware processor, perform actions of:
      receiving a query comprising at least a first part and a second part, the first part indicating to access at least a first database table and a second database table to generate an intermediate result and the second part indicating to perform a sort operation on the intermediate result with respect to columns across the first database table and the second database table to produce a final result; and
      building execution plans for generating the intermediate result according to the first part, wherein the intermediate result is to be used as the final result without building an execution plan for performing the sort operation, wherein building the execution plans comprises:
  determining equivalent sort columns of the columns across the first database table and the second database table based on the query, wherein the equivalent sort columns are equivalent to the columns across the first database table and the second database table and belong to the second database table; and
  identifying an order array based on the query, wherein the order array comprising one or more columns of the first database table and being equivalent to a subset of the equivalent sort columns.

5. The system of claim 4, wherein building execution plans for generating the intermediate result according to the first part further comprises:
  building a first execution plan for accessing the first database table based on the first part of the query by using a first index found to be consistent with the order array.

6. The system of claim 5, wherein building execution plans for generating the intermediate result according to the first part further comprises:
  building a second execution plan for accessing the second database table based on the first part of the query by using a second index found to be consistent with the equivalent sort columns on a basis of the first execution plan.

7. A computer program product comprising a computer-readable storage medium having program instructions embodied therewith, the program instructions executable by a processor to cause the processor to perform actions of:
  receiving a query comprising at least a first part and a second part, the first part indicating to access at least a first database table and a second database table to generate an intermediate result and the second part indicating to perform a sort operation on the intermediate result with respect to columns across the first database table and the second database table to produce a final result; and
  building execution plans for generating the intermediate result according to the first part, wherein the intermediate result is to be used as the final result without building an execution plan for performing the sort operation, wherein building the execution plans comprises:
    determining equivalent sort columns of the columns across the first database table and the second database table based on the query, wherein the equivalent sort columns are equivalent to the columns across the first database table and the second database table and belong to the second database table; and
    identifying an order array based on the query, wherein the order array comprising one or more columns of the first database table and being equivalent to a subset of the equivalent sort columns.

8. The computer program product of claim 7, wherein building execution plans for generating the intermediate result according to the first part further comprises:
  building a first execution plan for accessing the first database table based on the first part of the query by using a first index found to be consistent with the order array.

9. The computer program product of claim 8, wherein building execution plans for generating the intermediate result according to the first part further comprises:
  building a second execution plan for accessing the second database table based on the first part of the query by using a second index found to be consistent with the equivalent sort columns on a basis of the first execution plan.

\* \* \* \* \*